Aug. 21, 1945.   W. H. RILEY   2,383,342
HOLLOW PROPELLER
Filed Oct. 21, 1941   3 Sheets-Sheet 1
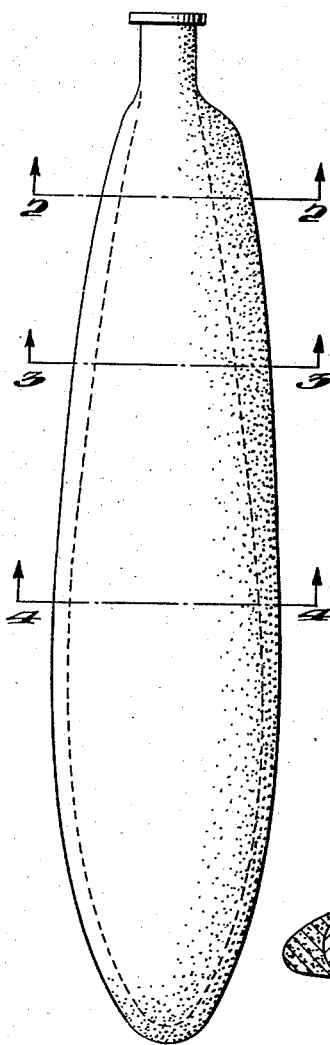
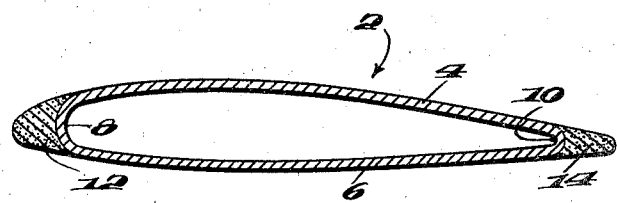
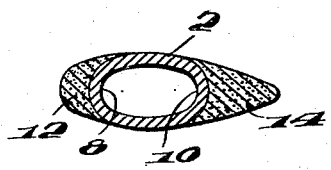
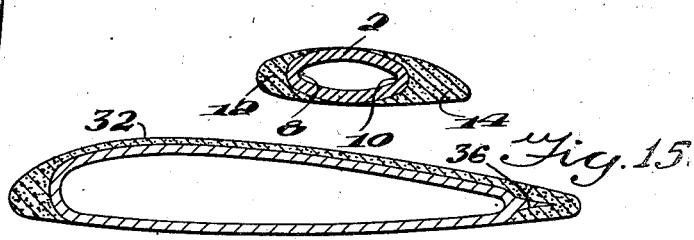
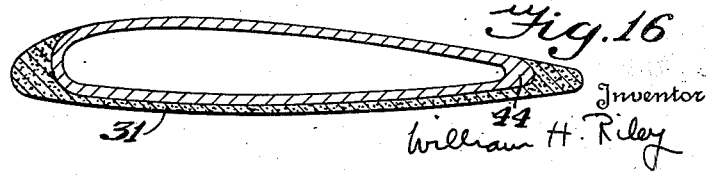

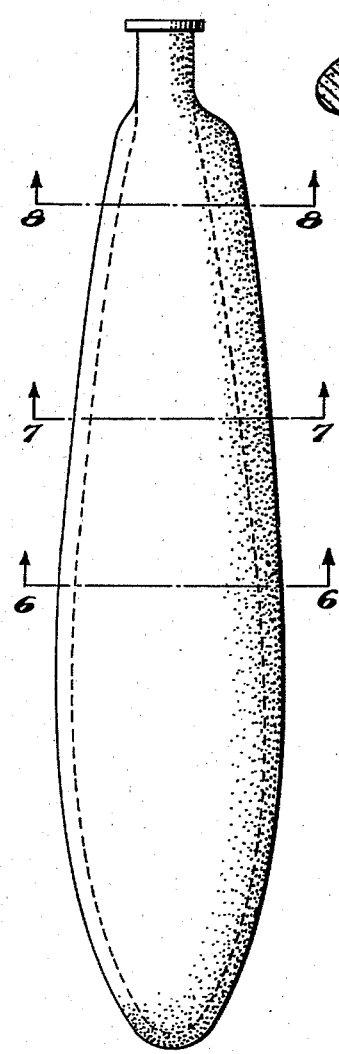
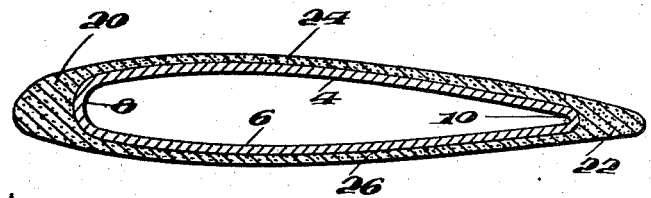
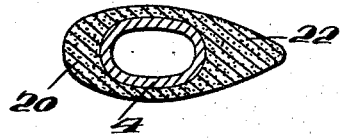
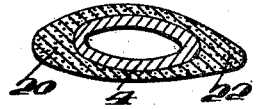

Patented Aug. 21, 1945

2,383,342

UNITED STATES PATENT OFFICE 2,383,342

HOLLOW PROPELLER

William H. Riley, Pittsburgh, Pa.

Application October 21, 1941, Serial No. 415,980

1 Claim. (Cl. 170—159)

This invention is an airplane propeller, particularly designed for lightness, strength and quantity production.

The body of the propeller is essentially a flattened hollow tube, the top and bottom walls of the tube preferably being formed integrally with gently curved leading and trailing portions, whereby no sharp angles or corners are presented. Such a tubular construction is stronger, weight for weight, than a blade made of solid metal. Furthermore, the elimination of sharp angles and corners greatly strengthens the tube. In actual practice, with sharp corners or angles, vibration and mechanical stresses tend to be concentrated at such angles or corners, with resultant failure of the propeller at these points. These sharp angles or corners are eliminated by the flattened tubular construction where the leading and trailing edges are gently curved.

Such a flattened tubular construction is, however, not readily susceptible of being manufactured in stream-line form. To complete the stream-lined or airfoil contour of the blade, supplementary body portion or portions are provided, of plastic material, which may be thermostatically bonded to the hollow tubular core or body portion. Once the proper dies are made for the bonding operation, the airfoil contour of the blade may be rapidly and accurately completed by bonding the plastic material to the metallic core for giving a finished propeller of correct airfoil contour.

The supplementary body portion, in addition to its primary function of completing the correct airfoil contour, also materially strengthens the blade and under certain conditions presents a better surface to wear by abrasion than metal.

In one aspect of the invention, the major portion of the flattened metallic tubular core is exposed, the supplementary body portions of plastic material being bonded to the core for forming the leading and trailing edges of the blade.

In another aspect of the invention, the supplementary body portions of plastic material, in addition to forming the leading and trailing edges of the blade may completely cover the metallic core. Also, if desired, the plastic portion additionally may cover only one surface of the blade, leaving the other surface exposed, or may be used in the most advantageous manner to obtain the desired airfoil contour.

A further feature of the invention is that the leading edge, or the trailing edge, or both, of the metallic body portion, may be strengthened by the use of additional metal extending along such edge or edges. This additional metal may be in the form of a thickened leading or trailing edge, or in the form of a flange extending outwardly and forwardly from the leading edge, or extending outwardly and rearwardly from the trailing edge or both. Such thickened portions or flanges may be integral with the metallic body portion or may be of a separate body of metal welded thereto. The stream-lined contour is completed as before by the use of non-metallic plastic material bonded to the body portion and surrounding and enclosing said thickened walls or outwardly extending flanges.

In order to explain the invention more fully, reference is made to the accompanying drawings illustrating in more detail the described construction.

In these drawings:

Figure 1 is a plan view of an airplane blade in accordance with the present invention.

Figure 2 is a cross section taken on the line 2—2 of Figure 1.

Figures 3 and 4 are cross sections taken on approximately lines 3—3 and 4—4 of Figure 1.

Figure 5 is a plan view of another embodiment of the invention.

Figures 6, 7 and 8 are cross sections taken on approximately lines 6—6, 7—7 and 8—8 of Fig. 5.

Figure 9:
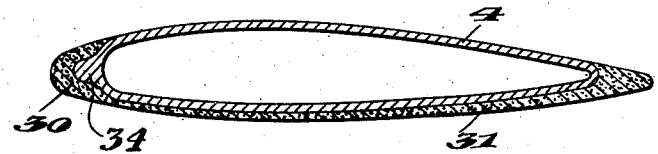

Figure 9 is a cross section of a modified blade where the top of the metallic body portion is exposed.

Figure 10:
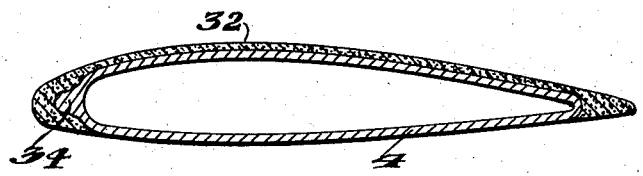

Figure 10 is a cross section of a modified blade where the bottom of the metallic body portion is exposed.

Figure 11:
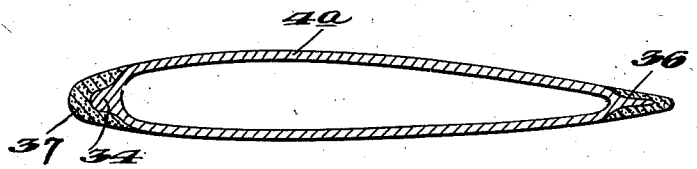

Figure 11 is a cross section of a modification where the leading and trailing edges of the metallic body portion are strengthened by flanges.

Figure 12:
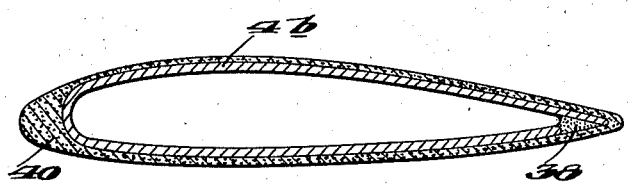

Figure 12 is a cross section of a modification where the trailing edge of the body portion is strengthened and completed by a weld.

Figure 13:
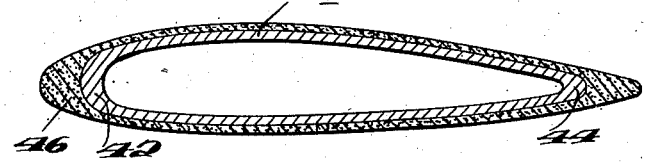

Figure 13 is a cross section of a modification where the leading and trailing edge of the metallic body portion are strengthened by thickened walls.

Figure 14:
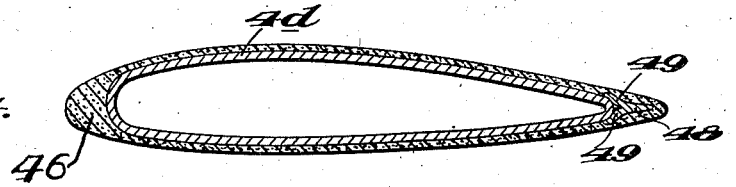

Figure 14 is a cross section of a modification where the trailing edge is strengthened by the use of an attached flange.

Figs. 15 and 16 are cross sectional views of modifications similar to Figs. 9 and 10, wherein the trailing edges of the metal body are strengthened by additional metal.

Referring now to these drawings in which similar reference characters represent similar parts, the main body portion 2 of the blade is of metallic flattened tubular construction, having an upper face 4 and a lower face 6. The preferred metal is high quality steel of suitable tensile strength. Other suitable metals could, of course, be used. The upper and lower faces are preferably integral with gently curved leading and trailing portions 8 and 10 whereby a one-piece construction is provided without corners or sharp angles, providing a very strong, relatively light and rigid core.

The airfoil contour of the blade is completed by a supplementary body portion comprising a leading edge 12 and a trailing edge 14, made of some suitable thermoplastic material which is thermostatically bonded to the metallic core, the preferred material being vulcanized rubber. Other suitable plastics, however, such as vulcanized fiber could be used.

With this form of the invention, most of the metallic body portion is exposed, the leading and trailing edges of the core being covered by the plastic leading and trailing edges 12 and 14.

In the form of the invention shown in Figures 5 to 8, the metallic body portion is of substantially the same shape and material as shown in the earlier figures and corresponding parts are similarly numbered. In this form of the invention, however, the supplementary body portion comprises a leading edge 20, a trailing edge 22, an upper covering 24 and a lower covering 26. The portions 20, 22, 24 and 26 of the supplementary body portion are of thermoplastic material thermoplastically bonded throughout to the metallic core and completely covering it.

In the form of invention shown in Figure 9, the metallic body portion 4 is provided with a supplementary plastic body portion, indicated generally at 30, for completing the airfoil contour, the plastic including a portion 31 covering the bottom or thrust side of the blade, leaving the other or top side exposed. The leading edge is strengthened by additional metal 34.

In the form shown in Fig. 10 the metallic body portion 4 has its air foil contour completed by a supplementary plastic body portion 32 bonded to the metal, the plastic covering the top of the blade and leaving the bottom or thrust side exposed. The leading edge is strengthened by additional metal 34.

In the form of invention shown in Fig. 11, the metallic body portion 4a is strengthened by the use of additional metal in the form of a forwardly and outwardly extending thick flange 34 at the leading edge, and by the use of a rearwardly and outwardly extending somewhat thinner flange 36 at the trailing edge. The airfoil contour is completed as before by the use of plastic material 37 bonded to the metal and completely enclosing flanges 34 and 36.

In the form of invention shown in Fig. 12, the metallic body portion 4b is strengthened by the use of additional metal in the form of a welded insert or fillet 38, the airfoil contour being completed by the plastic, supplementary body portion 40 bonded to the metal.

In the form of invention shown in Fig. 13, the metallic body portion 4c is strengthened by the use of additional metal in the form of a thickened wall 42 at the leading edge and a thickened wall 44 at the trailing edge, the airfoil contour being completed as before by a supplementary plastic body portion 46 bonded to the metal.

In the form of invention shown in Fig. 14, the metallic body portion 4d has its trailing edge strengthened by the use of a flange 48 having branches 49 extending upwardly and downwardly and welded to the trailing edge. The leading edge could be strengthened by a similar flange or by an integrally formed reinforcement as in Fig. 11 or 13 for example.

With the several forms of the invention as described in Figs. 11 to 14, the supplementary plastic body portion could completely enclose the metallic body portion, or one side or the other of the metallic body portion could be exposed, as in Fig. 9 or Fig. 10.

In Fig. 15, the thrust side of the blade is exposed, as in Fig. 10, and the metal body is strengthened by additional metal 36 at the trailing edge. In Fig. 16, the top or suction side of the blade is exposed, as in Fig. 9, and the metal body is strengthened by additional metal 44 at the trailing edge.

There is thus provided a composite propeller comprising a flattened tubular metallic core which presents maximum strength for the amount of metal used by virtue of the tubular construction, and wherein sharp angles and corners with their resultant disadvantages are avoided. The airfoil contour of the blade is completed by a supplementary body portion or portions of plastic material. Both the tubular core and the plastic supplementary body portion may be readily made and assembled by quantity production methods and therefore are of particular value in the present emergency.

While the preferred constructions have been described in some detail, it should be understood that the invention is not limited to the exact structure shown, but may be expressed in other ways as falling within the scope of the following claim.

I claim as my invention:

An airplane propeller blade comprising a hollow metallic body portion of flattened, tubular shape, extending the full length of the blade, one of the edges of such body portion being reenforced and strengthened by additional metal at such edge, and a supplementary body portion of plastic material thermoplastically bonded to only one side of the blade, leaving the opposite metallic side of the body portion exposed, said supplementary plastic body portion being substantially thickened at its leading and trailing edges and extending for the full length of the blade, and serving to complete the airfoil contour thereof.

WILLIAM H. RILEY.